United States Patent [19]

Bayer et al.

[11] Patent Number: 4,908,405
[45] Date of Patent: Mar. 13, 1990

[54] GRAFT COPOLYMERS OF CROSSLINKED POLYMERS AND POLYOXYETHYLENE, PROCESSES FOR THEIR PRODUCTION, AND THEIR USAGE

[75] Inventors: Ernst Bayer, Bei der Ochsenweide, D-7400 Tubingen; Wolfgang Rapp, Stuttgart, both of Fed. Rep. of Germany

[73] Assignee: Ernst Bayer, Tubingen, Fed. Rep. of Germany

[21] Appl. No.: 815,634

[22] Filed: Jan. 2, 1986

[30] Foreign Application Priority Data

Jan. 4, 1985 [DE] Fed. Rep. of Germany ....... 3500810

[51] Int. Cl.[4] .............................................. C08F 8/00
[52] U.S. Cl. .................................. 525/61; 525/328.8; 525/330.6; 525/332.2; 525/332.9; 525/333.3; 525/333.4; 525/385
[58] Field of Search ..................... 525/332.9, 61, 333.3, 525/333.4, 332.2, 328.8, 330.6

[56] References Cited

U.S. PATENT DOCUMENTS

| | | | |
|---|---|---|---|
| 3,173,892 | 3/1965 | Kun | 525/385 |
| 3,941,849 | 3/1976 | Herold | 525/523 |
| 4,083,834 | 4/1978 | Komatsu et al. | 525/332.9 |
| 4,085,168 | 4/1978 | Milkovich et al. | 525/385 |

OTHER PUBLICATIONS

Makromol. Chem. Rapid Common., 3:217 (1982); 2:621(1981).

Primary Examiner—Joseph L. Schofer
Assistant Examiner—Bernard Lipman
Attorney, Agent, or Firm—Birch, Stewart, Kolasch & Birch

[57] ABSTRACT

The invention relates to graft copolymers of crosslinked polymers and linear polyoxyethylene, processes for their production, and their use as a substrate for peptide or nucleotide synthesis or for the covalent fixation of peptides, active protein compounds, and enzymes for affinity chromatography, diagnostic agents, and biotechnological methods.

9 Claims, 1 Drawing Sheet

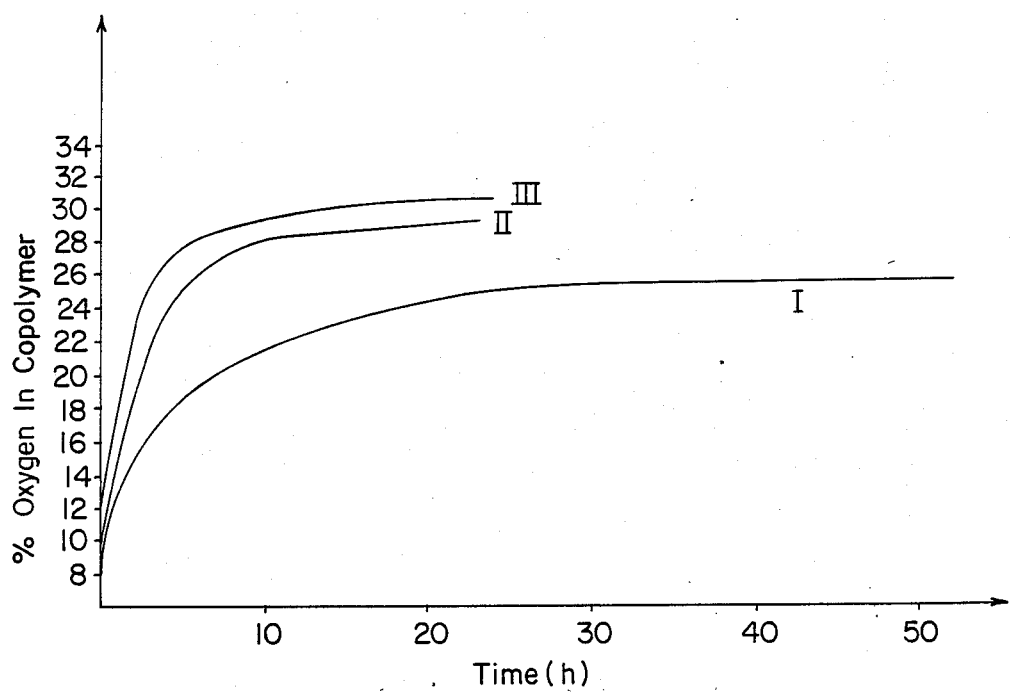

GRAFT COPOLYMERS OF CROSSLINKED POLYMERS AND POLYOXYETHYLENE, PROCESSES FOR THEIR PRODUCTION, AND THEIR USAGE

BACKGROUND AND SUMMARY OF THE INVENTION

The present invention relates to graft copolymers of crosslinked polymers and linear polyoxyethylene, processes for their production, and their use.

Graft copolymers of crosslinked, insoluble polymers and polyoxyethylene are of importance as substrates for peptide synthesis and for the immobilization of low-molecular and high-molecular active agents for affinity chromatography, diagnostic agents, and biotechnological methods. Heretofore, such graft copolymers have been prepared from crosslinked, chloromethylated polystyrene and shorter polyethylene glycols in accordance with the Williamson ether synthesis:

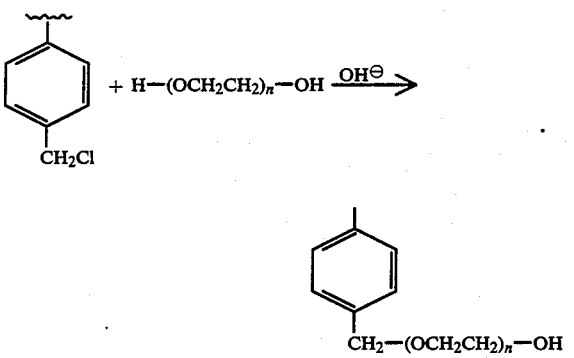

(cf. Makromol. Chem. Rapid Commun. 3 : 217 [1982]; 2, 621 [1981]). One disadvantage of this process resides in that the polystyrene is frequently inadequately charged with polyoxyethylene. The yields drop very drastically, primarily with an increasing molecular weight of polyoxyethylene, and only relatively short oligoethylene glycol chains with molecular weights of up to 1320 could be bound to the polystyrene. Another drawback in the ether synthesis is the formation of cyclic ethers by the reaction of both terminal hydroxy groups of polyoxyethylene with the chloromethylated polystyrene whereby the terminal hydroxy groups, required for the carrier function, are once again decreased.

The graft copolymers produced in this way exhibit, in their usage, inadequate reactivity, a charging with polyoxyethylene that is too low, and an insufficient stability of the bond during immobilization. Therefore, linear, homogeneously soluble polymers, such as polyoxyethylene, have frequently been employed for peptide synthesis. These soluble polymers, though, can be separated only with extreme difficulty.

It is thus an object of the present invention to provide graft copolymers exhibiting higher reactivity, higher charging, and higher stability of the bond during immobilization than conventional polymers, as well as a process for producing these graft copolymers, which avoids the disadvantages of the above-described prior art process.

This object is obtained by the graft copolymers of the present invention, containing, on a crosslinked polymer, several polyoxyethylene residues or chains with an average molecular weight of 500–50,000, and having 0.02–15 meq free hydroxy groups per gram of copolymer. Preferably, the amount of hydroxy groups is 0.05–15 meq/g, most preferably 0.05–10 meq/g.

With the use of crosslinked polystyrenes, this range is preferably 0.02–2 meq/g, especially preferably 0.05–0.7 meq/g. When using polyvinyl alcohols as the crosslinked polymers, this range is 1–15 meq/g, preferably 1–10 meq/g.

The average molecular weight of the polyoxyethylene chains is preferably from 800–10,000, especially from 900 to 6,000 with the optimum range being from 2,000 to 3,000.

The crosslinked polymer is preferably a polyvinyl alcohol, polyhydroxystyrene, a polymer produced from chloromethylated polystyrene and ethylene glycol or oligoethylene glycol, or a polyacrylate or polymethacrylate functionalized by hydroxy groups. The extent of crosslinking of these polymers herein is generally 0.05–10%, preferably 0.1–8%, especially preferably 0.2–5%. The most suitable extent of crosslinking is 1–2%, especially when using polystyrenes crosslinked with divinylbenzene.

Binding of the polyoxyethylene chains to the crosslinked polymers takes place preferably by way of hydroxy or amino groups of the crosslinked polymer. These can be present per se in the polymer, such as, for example, in the polyvinyl alcohol and polyhydroxystyrene, or they can be introduced subsequently by functionalizing. The amount of hydroxy groups (extent of functionalization) is generally in a range from 0.02 to 25 meq/g of crosslinked polymer, preferably 0.05–15 meq/g. Most suitably, a polystyrene is utilized having an extent of functionalization of 0.05–0.7 meq/g, or a polyvinyl alcohol is utilized with an extent of functionalization of 1–15 meq/g.

The process for preparing the graft copolymers of the present invention is characterized by reacting crosslinked polymers with ethylene oxide.

By suitably choosing the reaction temperature, the reaction period, the monomer concentration, and the solvent, the reaction can be controlled so that any desired average molecular weight can be obtained for the polyoxyethylene chain. Preferably, the reaction temperature is in the range from 20° to 100° C., especially preferably in a range from 60° to 80° C. The reaction time is preferably 30 minutes to 150 hours.

The reaction medium employed is one of the aprotic, organic solvents inert to the reaction; ethers are especially suitable, such as, for example, dioxane, tetrahydrofuran, or diglycol ethers, as well as toluene, benzene, xylene, dimethylformamide, or dimethyl sulfoxide.

The reaction is optionally conducted in the presence of alkaline or acidic catalysts. Suitable alkaline catalysts are, for example, alkali metals, such as lithium, sodium, or potassium; metallic hydrides, such as sodium hydride, calcium hydride; alkali metal amides, such as sodium amide; Grignard compounds or alcoholates. Preferably, potassium is employed. Suitable acidic catalysts are, for example, hydrogen chloride, sulfuric acid, or p-toluenesulfonic acid.

Advantageously, in a first stage, oligoethylene glycol chains of the formula $H-(OCH_2CH_2)_n-OH$, wherein n stands for 2–20, are bound to the crosslinked polymer. This reaction is carried out under conditions customary for etherification or Williamson synthesis. An aqueous sodium hydroxide solution can also serve as the base for the Williamson synthesis.

In a second stage, the oligoethylene chain is then extended with ethylene oxide. This two-stage process is suitable, in particular, for the production of polystyrene-polyoxyethylene graft copolymers.

The graft copolymers of the present invention can be utilized as substrates for peptide synthesis and nucleotide synthesis, for affinity chromatography, for the covalent fixation or immobilization of peptides, active protein compounds on enzymes in biotechnological reactions, and as active agents in diagnostic media.

On account of the hydroxy groups present in the graft copolymers of the present invention, peptides can be built up stepwise by means of conventional methods of peptide synthesis (Peptides, vol. 2, Academic Press, 1979). Surprisingly, such immobilized polyoxyethylenes with an average molecular weight of 1,000–2,000 show, in peptide coupling reactions, a higher reaction velocity than non-immobilized polyoxyethylenes in solution. This high reactivity thus also permits immobilization of proteins, enzymes, and other active compounds.

The degree of polymerization and/or the average molecular weight of the grafted copolymers can be affected by the parameters of temperature, time, and monomer concentration. For example, it has been found in connection with PSPOE (polystyrene-polyoxyethylene) that high degrees of polymerization cannot be attained at low reaction temperatures (56°–58° C.), in spite of high amounts of monomer added and a long reaction period. An average molecular weight is obtained for polyoxyethylene (POE) grafted onto a modified polystyrene substrate of 2,000 (PSPOE-2000).

Reaction temperatures that are too high, or polymerization velocities that are too high, lead to destruction of the polystyrene substrate matrix. A reaction temperature of 70°–73° C. proved to be favorable. Different degrees of polymerization can be obtained by varying the amounts of monomer added and the reaction time. The curve for PSPOE-5600 in FIG. 1 illustrates the course of the reaction with relatively low amounts of monomer added, while the curve for PSPOE-6900 illustrates the course of the reaction at higher amounts of added monomer. Data for the graft copolymers PSPOE are listed in Table 1, with the course of the reaction being shown in FIG. 1.

DETAILED DESCRIPTION OF THE INVENTION

The following Examples are given as being exemplary of the present invention and accordingly should not be considered as limiting the scope of the present invention.

EXAMPLE 1

Production of a Substrate from Crosslinked, Chloromethylated Polystyrene (PS) and Tetraethylene Glycol (PSTEJ)

A solution of 350 ml of dioxane, 23 ml (133 mmol) of tetraethylene glycol (TEG), and 13.5 ml of a 20% aqueous NaOH solution is combined with 10 g (12.5 meq Cl) of chloromethylated polystyrene crosslinked with 1% divinylbenzene (DVB). The mixture is heated to boiling. The reaction is finished after 120 hours; the substrate is suctioned off and washed 10 times with respectively 100 ml of dioxane, dioxane/H₂O1:1; ethanol, CH₂Cl₂, dioxane, methanol, and dried over P₄O₁₀ under vacuum. The elementary analysis is as follows:

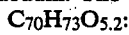

Calculated: C 84.1; H 7.4; O 8.3;
Found: C 83.8; H 8.1; O 8.1.

The hydroxy number was determined to be 0.99 meq/g of copolymer.

EXAMPLE 2

Production of Polystyrene-Polyethylene Glycol [Average Molecular Weight of Polyethylene Glycol Chain =2,000 (PSPOE-2000)]

9.4 g (about 9.4 meq OH) of the PSTEG substrate obtained in accordance with Example 1 is suspended with 370 mg (9.4 mmol) of potassium in 600 ml of dry dioxane and stirred vigorously under a N₂ atmosphere overnight at 60°–70° C. During the procedure, the solution assumes an orange coloring. The reaction temperature is regulated to be 56°–58° C. and, within 53.5 hours, 267 g (6.6 mol) of ethylene oxide is introduced into the reaction solution. The reaction system is then sealed, and the reaction mixture is agitated for another 52.5 hours. Under pressure, another 37 g (0.85 mol) of ethylene oxide is introduced within 2 hours into the closed system. After total reaction period of 320 hours, the reaction is terminated. Excess ethylene oxide is driven out with N₂, the reaction solution is cooled, acidified with dilute aqueous HCl to a pH 3–4, and the product is worked up.

EXAMPLE 3

Preparation of Polystyrene Polyoxyethylene (PSPOE-5600)

At 60°–70° C., 10 g (about. 10 mmol OH) of the PSTEG substrate is suspended under nitrogen with 500 mg (12.7 meq) of potassium and agitated overnight. During this step, the reaction solution assumes a yellow-orange discoloration. At 70° C., ethylene oxide is initially introduced into the reaction solution within 15 hours in an amount of 25 g (0.57 mol). During this step, the reaction temperature increases to 72°–73° C. In the subsequent 2.5 hours, 15 g (0.34 mol), then within 5 hours, 71 g (1.6 mol) of ethylene oxide are introduced into the reaction mixture. The reaction system is then sealed, and 14 g of ethylene oxide is forced under pressure into the gas space of the reaction system within 30 minutes. The mixture is agitated for another 14 hours, the temperature of the reaction solution dropping to 68° C. A further addition of ethylene oxide (86 g in 5 hours) leads initially to a temperature increase to 70° C., but thereafter the reaction temperature drops up to termination of the reaction to 65° C. after a total reaction period of 30.5 hours. Excess ethylene oxide is driven out with N₂, and the reaction solution is cooled off, acidified to pH 3–4 with dilute aqueous HCl, and worked up.

EXAMPLE 4

Preparation of Polystyrene-Polyoxyethylene (PSOPOE-6900)

Under N₂, 10 g (about 10 mmol OH) of PSTEG substrate is suspended with 500 mg (12.7 mmol) of potassium in 6,000 ml of dioxane and stirred overnight at 65°–70° C. The reaction solution assumes a slightly yellow coloring. The temperature of the reaction mixture is initially 70° C. Then, within 12 hours, 185 g (4.2 mol) of ethylene oxide is introduced into the reaction solution, adding 42 g (0.95 mol) in the first two hours. During this step the reaction temperature rises to 73° C. The reactor is sealed, and the mixture is agitated for another 12.5 hours, the temperature dropping to 68° C. up to the end of the reaction period. Excess ethylene oxide is driven out with $N_2$, and the reaction mixture is cooled, acidified to a pH 3–4 with dilute aqueous CHl, and worked up.

Working Up of the PSPOE Copolymers

The polymer is separated from the reaction solution through a porous plate (G3-mesh size) and washed respectively 8 times with dioxane, dioxane/$H_2O$ 1:1, water, ethanol, dioxane, and methylene chloride. After the last washing step, the mixture is combined with methylene chloride/diethyl ether 1:1 and suctioned off. During this step, the copolymer shrinks somewhat. The product is washed once with ether, once with methylene chloride, and then three times with ether. In order to dissolve out any still present, soluble POE, the product is extracted for 24 hours with THF in a Soxhlet apparatus, then washed three times with ether, and dried over $P_4O_{10}$ under vacuum.

EXAMPLE 5

Synthesis of C-Terminal Decapeptide of the Insulin B Sequence from PSPOE Graft Copolymers 44 g of the PSPOE polymer produced according to Example 4 is esterified with BOC-glycine according to the methods of liquid-phase synthesis (The Peptides, 2:285 et eq., Academic Press, New York 1979) so that 3.65 mmol of BOC-glycine is bound. Then the decapeptide is built up stepwise with the amino acid derivatives listed in Table 2 according to the methods of substrate-bound peptide synthesis.

A suspension in DMF is prepared from 6 g of the decapeptide polymer obtained according to the above directions, and irradiated under $N_2$ with a mercury vapor lamp at 330 nm and 25° C. for 22 hours. Thereafter, the product is filtered off from the polymer, and the solution of the peptide is evaporated to dryness. The blocked decapeptide in solution is purified on a silica gel column with chloroform/methanol/ethyl acetate/glacial acetic acid (65:25:9:1) as the eluent. The peptide fractions are collected and subsequently purified with methanol as the eluent over a "Sephadex" LH 20 column, thus obtaining 157 mg of blocked peptide revealing an amino acid analysis of 1.10 Glu, 1.06 Arg, 1.01 Gly, 2.01 Phe, 1.03 Tyr, 0.96 Thr, 0.95 Pro, 1.02 Lys and 1.00 Ala. The blocking groups can be split off with HF, thus yielding the free peptide.

EXAMPLE 6

Immobilization of Bovine Serum Albumin on α-Polystyrene -[α-(succinimido-oxycarbonyl)-ethylcarbonyl-]aminopoly(oxyethylene) (I)

Derivatization of the PSPOE substrate (mol.wt.$_{POE}$=5,100, 163 μmol OH/g) takes place analogously to Makromol. Chem. 182 : 1379–1384 (1981) and, respectively, Angew. Chem. 24 : 863–874 (1975). The capacity of I amounts to 75.6% of the originally present capacity.

2.5 g (37 μmol) of bovine serum albumin is dissolved in 10 ml of water and adjusted to a pH of 8 with 13 ml of a 1-molar $NaHCO_3$ solution. The albumin solution is centrifuged, then combined with 160 mg of substrate I and stirred for 22 hours under darkness at room temperature. After the reaction is finished, the mixture is suctioned off and the surface carefully washed with water. Once no more albumin can be detected in the filtrate, washing is repeated at least 15 more times, and the product dried under vacuum over $P_4O_{10}$.

Charging of albumin: 0.5 μmol/g=33 mg of albumin/g of substrate.

TABLE 1

| Properties of Various PSPOE Graft Copolymers | | | |
|---|---|---|---|
| | PSPOE-2000 Example 2 | PSPOE-5600 Example 3 | PSPOE-6900 Example 4 |
| Weight increase per gram of PS-TEG substrate produced pursuant to Example 1 | 2 g | 5.6 g | 6.9 g |
| Average molecular weight of grafted POE (dalton) | 2,000 | 5,600 | 6,900 |
| Free hydroxy groups per g of copolymer (meq/g) | 0.33 | 0.154 | 0.13 |
| % Charging, based on free hydroxy groups of PS-TEG substrate | 100 | 100 | 100 |
| Elementary Analysis | | | |
| C   Found | 64.1 | 59.3 | 59.0 |
|     Calculated | 64.9 | 59.0 | 58.2 |
| H   Found | 9.6 | 10.0 | 10.3 |
|     Calculated | 8.5 | 8.9 | 8.9 |
| O   Found | 26.3 | 30.6 | 30.7 |
|     Calculated | 26.6 | 32.1 | 32.8 |

TABLE 2

| Course of Synthesis of Couplings at Polymer to the Decapeptide of Insulin B Chain Sequence 30–21: | | | | |
|---|---|---|---|---|
| No. | Sequence | AS Derivative | Coupling Period (Hours) | Coupling Yield in % |
| 1 | $B_{30}$ | BOC—Ala—OBzl(2-$NO_2$—4-COOH) (B) | 20 | 99.4 |
| 2 | $B_{30-29}$ | BOC—Lys(o—BrZ)—OH (A) | 3 | 99.4 |
| 3 | $B_{30-28}$ | BOC—Pro (A) | 2 | 99.4 |
| 4 | $B_{30-27}$ | BOC—Thr(Bzl)—OH | 6 | 99.4 |

TABLE 2-continued

Course of Synthesis of Couplings at Polymer to the Decapeptide of Insulin B Chain Sequence 30-21:

| No. | Sequence | AS Derivative | Coupling Period (Hours) | Coupling Yield in % |
|---|---|---|---|---|
| 5 | $B_{30-26}$ | (A) BOC—Tyr(o—ClZ)—OH | 17 | 99.4 |
| 6 | $B_{30-25}$ | (B) BOC—Phe | 2 | 99.4 |
| 7 | $B_{30-24}$ | (A) BOC—Phe | 2 | 99.4 |
| 8 | $B_{30-23}$ | (A) BOC—Gly | 1 | 99.4 |
| 9 | $B_{30-22}$ | (A) BOC—Arg(Mbs)—OH | 3 | 99.4 |
| 10 | $B_{30-21}$ | (A) BOC—Glu(Bzl)—OH (A) | 3 | 99.4 |

What is claimed is:

1. A graft copolymer comprising a polymer having a degree of crosslinking of 0.05 to 10%, selected from the group consisting of a polyvinyl alcohol, a polyhydroxystyrene, a polymer produced from chloromethylated polystyrene and ethylene glycol, a polymer produced from chloromethylated polystyrene and oligoethylene glycols, a polyacrylate functionalized by hydroxy groups, and a polymethacrylate functionalized by hydroxy groups which contains polyoxyethylene chains which have an average molecular weight of 500 to 40,000;

said copolymer containing 0.02 to 15 meq free hydroxy groups per gram of copolymer, and being obtained by reacting the crosslinked polymer with ethylene oxide.

2. The graft copolymer of claim 1 wherein the amount of hydroxy groups is 0.05–10 meq/g.

3. The graft copolymer of claim 1 wherein the crosslinked polymer is crosslinked polystyrenes containing hydroxy groups in the amount of 0.05–0.7 meq/g.

4. The graft copolymer of claim 1 wherein the crosslinked polymer is polyvinyl alcohol containing hydroxy groups in the amount of 1–10 meq/g.

5. The graft copolymer of claim 1 wherein the average molecular weight of the polyoxyethylene chains is 800–10,000.

6. The graft copolymer of claim 1 wherein the average molecular weight of the polyoxyethylene chains is 2,000 to 3,000.

7. The graft copolymer of claim 1 wherein the extent of crosslinking of the copolymer is 1 to 2%.

8. The graft copolymer of claim 1 wherein the crosslinked polymer is polystyrene crosslinked with divinylbenzene.

9. The graft copolymer of claim 1 wherein the crosslinked polymer is produced from chloromethylated polystyrene and tetraethylene glycol.

* * * * *

UNITED STATES PATENT AND TRADEMARK OFFICE
CERTIFICATE OF CORRECTION

PATENT NO. : 4,908,405
DATED : March 13, 1990
INVENTOR(S) : Ernst BAYER et al

It is certified that error appears in the above-identified patent and that said Letters Patent is hereby corrected as shown below:

Please amend claim 1 as follows:

Line 10 and Line 11, change "500 to 40,000;" to

--500 to 50,000;--

Signed and Sealed this

Twenty-ninth Day of October, 1991

Attest:

HARRY F. MANBECK, JR.

Attesting Officer     Commissioner of Patents and Trademarks